United States Patent Office 3,290,575
Patented Dec. 6, 1966

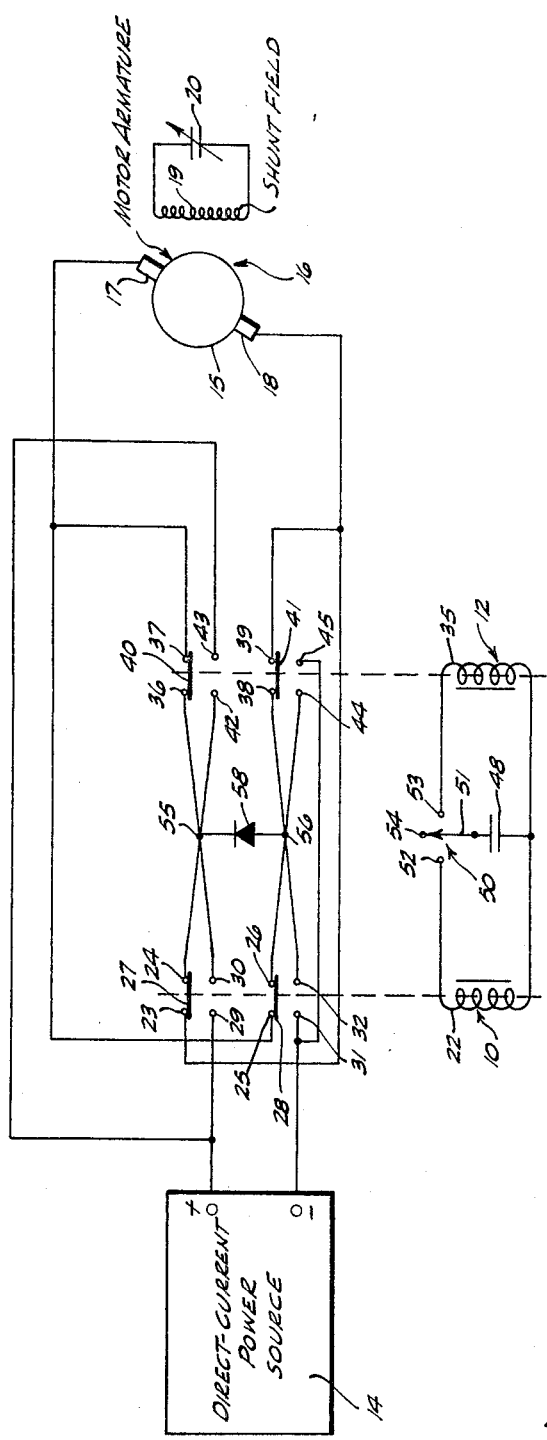

3,290,575
DIRECT-CURRENT MOTOR CONTROL
APPARATUS
Victor J. Modiano, Anaheim, Calif., assignor to Hughes
Aircraft Company, Culver City, Calif., a corporation
of Delaware
Original application May 1, 1964, Ser. No. 364,112.
Divided and this application Feb. 18, 1966, Ser. No.
528,458
2 Claims. (Cl. 318—261)

This invention relates to a direct-current motor control apparatus and, more particularly, to an apparatus capable of reversing the direction of rotation of a direct-current motor by means of contactors with minimum arcing upon the interruption of power to the load.

This application for patent is a division of application for Patent Serial No. 364,112 entitled, "Direct-Current Motor Control Apparatus," by Victor J. Modiano, filed May 1, 1964, and assigned to the same assignee as is the present case.

In present day motor reversing and dynamic braking systems, a typical practice is to employ a double-pole, double-throw current reversing switch in conjunction with two or more diodes or resistors to provide dynamic braking. In addition, most systems require switches having contacts capable of absorbing a substantial amount of arcing.

Accordingly, it is an object of the present invention to provide a simple, reliable, comparatively inexpensive apparatus for controlling the direction of rotation of a direct-current motor.

Another object of the present invention is to provide an improved direct-current motor reversing apparatus in incorporating switches having contactors of a conventional type.

Still another object of the present invention is to provide an apparatus for controlling the direction of rotation of a direct-current motor having at least a shunt field.

In accordance with the present invention, power of fixed polarity is applied in determinable opposite directions through first and second sets of contactors to apply a reversible polarity voltage across the armature of a direct-current motor to be controlled. The first and second sets of contactors which control the direction of current flow, and, hence, the polarity at the armature, are, in turn, actuated by first and second solenoid coils, respectively, to cause the motor to rotate in a selected direction. In a neutral position, i.e., with both first and second solenoid coils in a de-energized state, the armature of the motor is shorted through the contactors to provide dynamic braking whereby no voltage is externally applied thereacross. In addition, a diode is automatically connected across the armature in the transition period during the switching of either set of contacts thereby minimizing arcing due to the electromotive-force induced in the armature when the external voltage source is disconnected.

The above-mentioned and other features and objects of this invention and the manner of obtaining them will become more apparent by reference to the following description taken in conjunction with the accompanying drawings, wherein the figure illustrates a schematic circuit diagram of a preferred embodiment of the motor control apparatus of the present invention.

Referring now to the drawing, there is shown a preferred embodiment of the motor control apparatus of the present invention wherein solenoid relays 10, 12 (shown in the de-energized position) are employed to control the application of power from a direct-current power source 14 to the armature 15 of a motor 16. The armature 15 of motor 16 includes brushes 17, 18 for making contact with armature 15 and, in addition, includes a shunt field winding 19 which is energized by means of a variable direct-current power source 20.

The solenoid relay 10 includes a coil 22, normally-closed contacts 23, 24; and 25, 26 which are connected or "closed" by contactors 27, 28, respectively, and normally-open contacts 29, 30; and 31, 32. Similarly, solenoid relay 12 includes a coil 35, normally-closed contacts 36, 37; and 38, 39 connected together by means of contactors 40, 41, respectively, and normally-open contacts 42, 43; and 44, 45. In the energized position, the contactors 27, 28, 40, 41 open the normally-closed contacts 23, 24; 25, 26; 36, 37; and 38, 39 and connect the respective pairs 29, 30; 31, 32; 42, 43; and 44, 45 of normally-open contacts. Coils 22, 35 of solenoid relays 10, 12, respectively, are connected so that either one, but not both, may be energized by means of a battery 48 through a three-position switch 50. In particular, the negative terminal of battery 48 is connected to common extremities of the coils 22, 35 and the positive terminal thereof connected through the three-position switch 50 to the remaining terminals. The switch 50 includes a double-throw connector 51 connected to the positive terminal of battery 48 and capable of being connected to either of input terminals 52, 53 which are connected to the remaining extremities of the coils 22, 35, respectively, or to a neutral output terminal 54 which is isolated from the remainder of the apparatus.

The positive output terminal of direct-current power source 14 is connected to normally-open contact 29 of solenoid relay 10 and to normally-open contact 43 of solenoid relay 12. Similarly, the negative output terminal of direct-current power source 14 is connected to normally-open contact 31 of relay 10 and to normally-open contact 45 of relay 12. The brush 17 of motor armature 15 is connected to normally-closed contact 37 of relay 12 and to normally-closed contact 25 of relay 10. Brush 18 of motor armature 15, on the other hand, is connected to normally-closed contact 39 of relay 12 as well as to normally-closed contact 23 of relay 10. Also, normally-closed contact 24 and normally-open contact 30 of relay 10 are connected to a junction 55 which is, in turn, connected to normally-closed contact 36 and normally-open contact 42 of relay 12. In addition, normally-closed contact 26 and normally-open contact 32 of relay 10 are connected to a junction 56 which is, in turn, connected to normally-closed contact 38 and normally-open contact 44 of relay 12. A diode 58 is then connected from junction 56 to junction 55 and poled in a direction to allow normal current flow towards junction 55. The diode 58 must necessarily be of sufficient current handling capacity to handle currents developed by the current generated by the electromotive-force of armature 15 immediately after the direct-current power source 14 is disconnected.

In operation, the variable direct-current power source 20 is adjusted to allow a predetermined field current to flow through the shunt field winding 19. Normally this will be the rated field current of the motor 16. When the contactor 51 of the three-position switch 50 is in contact with the neutral contact 54, as shown in the drawing, the solenoid relays 10, 12 are both in the de-energized position whereby no voltage from the direct-current power source 14 is applied across the armature 15 of the motor 16. In order to start the motor 16 rotating in one direction, the contactor 51 is moved to connect with the contact 52 of switch 50 thereby energizing the solenoid relay 10 whereby the contactors 27, 28 are moved in a manner to connect the normally-open contacts 29, 30; and 31, 32. Under this situation, voltage from the direct-current power source 14 is applied through the contacts 29, 30; and 31, 32 of relay 10 across the junctions 55, 56 and through the normally-closed contacts 36, 37; and 38, 39 of relay 12 to the brushes 17, 18 of the armature 15 thereby starting the motor 16 to rotate in a direction consistent with field established by shunt field 19. It is to be noted that the diode 58 is backbiased during this phase of operation.

In order to stop the motor, the contactor 51 of switch 50 is again moved to the neutral contact 54. As is typical of electromechanical relays, the contactors 27, 28 of relay 10 require a finite period of time to return from the normally-open contacts 29, 30; 21, 32 to the normally-closed contacts 23, 24; 25, 26. During this finite period of time, the armature 15 of motor 16 generates an electromotive-force which causes a current to flow from brush 18 through normally-closed contacts 38, 39, diode 58, normally-closed contacts 36, 37, back to the brush 17. In that the current at all times has a closed path from brush 18 to brush 17 through diode 58, the voltage across armature 15 cannot increase upon opening of the circuit from direct-current power source 14 thereby minimizing the arcing which would normally occur at the contacts 29, 30; 31, 32 upon de-energization of the coil 22. Upon completion of the finite period of time required for the contactors 27, 28 to return to their de-energized position, the normally-closed contacts 23, 24; 25, 26 of relay 10 provide a short circuit across the armature 15 of motor 16 whereby dynamic braking of the motor is achieved.

In order to rotate the motor 16 in a direction opposite to the aforementioned previous direction, the contactor 51 of switch 50 is moved to contact 53 thereby energizing relay 12. Under these circumstances, voltage from the direct-current power source 14 is applied through the normally-open contacts 42, 43; 44, 45 of relay 12 and normally-closed contacts 23, 24; 25, 26 of relay 10 to arrive across the armature 15 with a polarity opposite to that of the previous situation. Note, however, that the diode 58 is again back-biased during this phase of operation. In that the polarity across the armature 15 has been reversed, while the direction of current flow through the shunt field 19 has been allowed to remain the same, the direction of rotation of the motor is opposite to the aforementioned previous direction. As before, upon de-energization of the relay 12 the diode 58 provides a return path for the current resulting from the electromotive force generated in the armature 15 during the time required for the contactors 40, 41 of relay 12 to assume their de-energized position. Upon reaching the de-energized position, a short circuit is established across the armature 15 in the same manner as before thereby providing complete dynamic braking.

Although the invention has been shown in connection with a certain specific embodiment, it will be readily apparent to those skilled in the art that various changes in form and arrangement of parts may be made to suit requirements without departing from the spirit and scope of the invention.

What is claimed is:

1. An apparatus for controlling the polarity of a direct-current voltage applied across a utilization device having first and second input terminals, said apparatus comprising a direct-current power source having first and second output terminals, the potential developed at said first output terminal being positive relative to the potential at said second output terminal; first and second switch means each including first and second pairs of normally-open contacts and first and second pairs of normally-closed contacts; means connecting said first output terminal of said direct-current power source in parallel through said first pairs of normally-open contacts of said first and second switch means to a first junction and from said first junction through said normally-closed contacts of said first and second switch means to said second and first input terminals of said utilization device, respectively; means connecting said second output terminal of said direct-current power source in parallel through said second pairs of normally-open contacts of said first and second switch means to a second junction and form said second junction and from said second junction through said second pairs of normally-closed contacts of said first and second switch means to said first and second input terminal of said utilization device, respectively; and unidirectionally conducting means connected from said first junction to said second junction, said unidirectionally conducting means being poled to allow normal current flow in a direction towards said first junction.

2. The apparatus for controlling the polarity of a direct-current voltage applied across a utilization device as defined in claim 1 wherein said utilization device constitutes a direct-current motor having a shunt field winding, and said apparatus additionally including means connected to said shunt field winding for providing field excitation for said direct-current motor.

References Cited by the Examiner

UNITED STATES PATENTS

| | | | |
|---|---|---|---|
| 1,732,711 | 10/1929 | Boddie | 318—261 |
| 2,615,152 | 10/1952 | Apple | 318—261 |
| 2,912,632 | 11/1959 | Turtil | 318—261 |

ORIS L. RADER, *Primary Examiner.*

G. FRIEDBERG, *Assistant Examiner.*